UNITED STATES PATENT OFFICE.

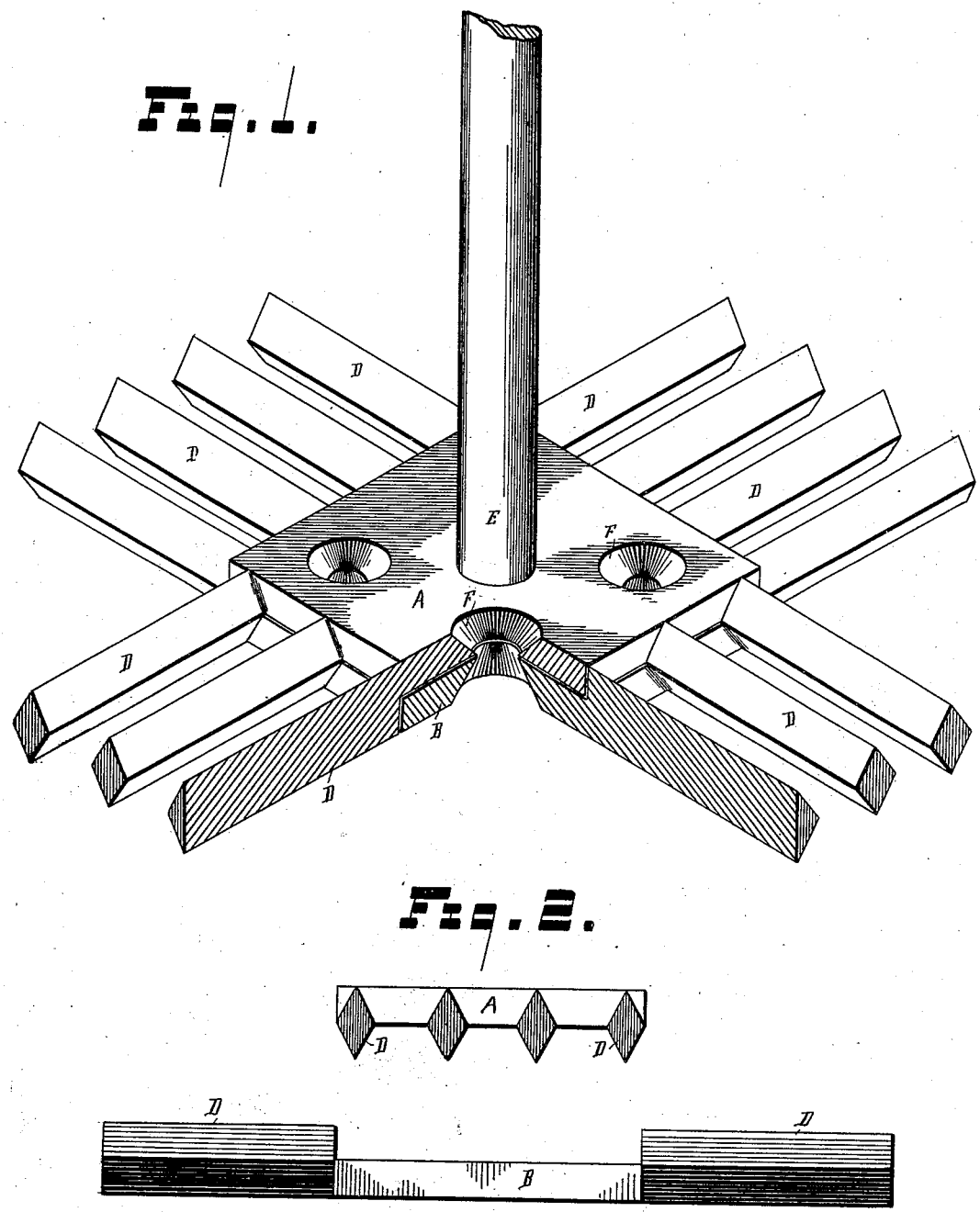

ABRAM SCHUYLER, OF SCOTT'S, MICHIGAN, ASSIGNOR OF ONE-HALF TO ADELY SCHUYLER, OF SAME PLACE.

CHURN-DASHER.

SPECIFICATION forming part of Letters Patent No. 508,768, dated November 14, 1893.

Application filed February 20, 1893. Serial No. 463,050. (No model.)

*To all whom it may concern:*

Be it known that I, ABRAM SCHUYLER, a citizen of the United States, residing at Scott's, county of Kalamazoo, State of Michigan, have invented a new and useful Churn-Dash, of which the following is a specification.

This invention relates to that class of churn dashes which are provided with independent, separated fingers; and it has for its object to facilitate the action of the dash in the cream, with an increased agitation of said cream.

In the drawings forming a part of this specification, Figure 1 is a perspective view, parts being broken away; and Fig. 2 is a side elevation, showing parts of the dash separated, ready to go together.

The dash as herein illustrated is made of two strips of wood centrally crossing each other at right angles and halved together by mortising the contiguous faces of each, but the dash may be made of one solid piece and made of metal, if preferred.

Each end of the crossing strips, A and B, is provided with a series of separated, outwardly extending fingers, D, which fingers are made diamond-shape, when viewed in cross section, with their side edges presented toward each other, so that their upper and lower edges will cut vertically through the cream. By this means the entrance for the cream between them, whether from beneath or above, during the vertical play of the dash, is somewhat funnel or wedge shaped, causing the cream to rush between them with greater force and creating a lively disturbance of the cream, with comparatively little exertion of the operator.

The central portion of the dash, to which the handle, E, is attached, is provided with holes, F, through the same, which holes are made outwardly flaring, or funnel-formed, at each end, by which means the cream from below and above rushes with force through said holes. Thus the entrances to all the passages for the cream through the dash, both from above and below, are wedging, giving great force and agitation to all the moving cream.

Having thus described my invention, what I claim as new, and desire to secure by Letters Patent of the United States, is—

A churn-dash, consisting of the center portion, to which the handle is attached, provided with a series of vertical holes outwardly flaring in their upper and lower ends, and a series of fingers diamond-shaped in cross section, whereby the entrances for the cream through both the fingers and holes from above and below are wedging; substantially as set forth.

In testimony to the foregoing I have hereunto subscribed my name in the presence of two witnesses.

ABRAM SCHUYLER.

Witnesses:
 AI. FULLERTON,
 R. G. SMITH.